United States Patent Office 3,519,618
Patented July 7, 1970

3,519,618
STARCH DERIVATIVE
Stanley M. Parmerter, Wheaton, Ill., assignor to CPC International Inc., a corporation of Delaware
No Drawing. Filed Jan. 31, 1968, Ser. No. 701,819
Int. Cl. C08b 19/04
U.S. Cl. 260—233.3
12 Claims

ABSTRACT OF THE DISCLOSURE

Covers a modified starch composition. Particularly covers a product prepared by reacting granular starch and an unsaturated aldehyde to produce a substantially noncross-linked granular starch derivative having the following general structural formula:

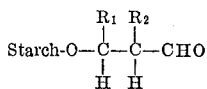

where $R_1$ and $R_2$ are selected from the group consisting of hydrogen, lower alkyl radicals and halogen. Product is useful as a binder for non-woven fabrics and for other purposes. Also covers a method of preparing the above defined composition.

---

Starch compositions have been utilized in innumerable and diverse industrial applications, for example, as coatings, sizing agents, adhesives, etc. While such starches, often in derivatized or modified form, have a long history of utility in such applications there is a continual demand to meet a broad industrial need imposed by new and modified processing means.

As an example, process advances in many areas have given rise to a variety of bonded fabric compositions such as apparel fabrics, and and also to fabrics to be used as chemical filters and the like. The role of the binder, of course, is to hold together a fiber mass, of which the fibers themselves have substantially no cohesion. Therefore, integrity must be imparted to the bound fabric through the application of a binder where, most recently, starch-based binders have been largely or mainly replaced by synthetic polymer products of superior properties. As a general case, it is common and necessary that the filter binding agent possess a substantial "wet strength" or solvent resistance in order that the filter element may be used for the filtration of liquids. Heretofore, such resistance or durability has been generally lacking in starch compositions, and while found to some degree in certain synthetic polymers, these latter materials are costly and not necessarily of broad utility. In special cases where starch products have managed to maintain acceptability through combination of economy and performance, it has been common for the starch manufacturer to meet the requirements of a limited market only through specialty processing at a marginal profit.

Another traditional area for the application of starches is in imparting a desired viscosity level to various liquids such as, e.g., synthetic polymer compositions. But again, in the recent past various derivatized cellulose products, salts of polyacrylic acid and the like, have proven superior in properties to starch although more costly to the user.

Therefore, it is an obvious advance in the art to provide a starch composition which exhibits not only the economics inherent in its class, but also competes on its merits as a binder in non-woven textile fabrics and filter elements; has superior utility over competing products as a thickener and extender in liquid synthetic polymer compositions; and has a superior utility in ease of handling, formulation and application.

Thus, it is an obect of the present invention to provide a novel starch composition having value and improved properties in a wide number of end-uses, and having superior economy in many end-uses to which synthetic polymers have been applied.

A more specific obect of the invention is to provide a starch composition which is useful as a binder for non-woven fabrics whereby chemical filters of improved utility and economy are formed.

A further object of the invention is to provide a starch composition having particular utility in the thickening and extending of fabric-laminating adhesive polymer compositions.

A still further object of the invention is to provide a starch composition product which readily reconstitutes in water to serve as a rapidly-prepared, specially convenient adhesive, binder and extender for a plurality of applications.

Yet another object of the invention is to provide a method of preparing the above product.

Other objects will appear hereinafter.

Broadly speaking, the product of the invention is a reaction product of a granular starch and an unsaturated aldehyde whereby a substantially noncross-linked granular starch derivative is prepared having the following general structural formula:

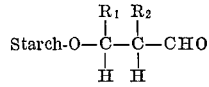

where $R_1$ and $R_2$ are selected from the group consisting of hydrogen, lower alkyl radicals and halogen. These products may have a D.S. (degree of substitution) which may range as low as about 0.001 to as high as about 0.08 in terms of an average figure per anhydroglucose unit. More preferred products have a D.S. ranging from about 0.004 to about 0.04.

It is important that the above products when prepared be substantially noncross-linked in character. If materials are prepared which have even minimal cross-linked character they tend to lose utility as binders or adhesives since they will not readily paste up in water. As a consequence then, products of this type cannot then be applied readily to textiles and the like.

The reaction products of the invention are probably best described in terms of their method of preparation. Generally an aqueous dispersion of granular starch and an unsaturated aldehyde is prepared and reacted at a temperature below the gelatinization point of the particular starch employed. The reaction is then carried out over a pH ranging from about 4 to about 9. The pH of the reaction more often varies from about 4 to about 6 when an aldehyde such as acrolein is utilized as a reactant. Deviation from this pH range results in products which have a substantial number of cross-linked sites.

The reaction is usually carried out at room temperature although slightly higher or lower temperatures may also be employed. Thus, the reaction temperature may range from about room temperature up to about 50° C. More often the reaction is run at a temperature ranging from about room temperature up to about 35° C.

The starch derivatization is usually carried out in an aqueous medium whereby granular starch is first suspended in water, and then a reactive unsaturated aldehyde added thereto. The aqueous starch slurry should usually contain starch solids in an amount ranging from about 15% to about 50% by weight. More often the slurry contains 25–40% by weight of starch. The reaction time may be widely varied, and is particularly dependent upon the reactivity of the unsaturated aldehyde used in the process. In the usual case the time of reaction varies from about 4 to about 24 hours. Again, the amount of aldehyde reactant in proportion to starch reactant may be adjusted throughout a considerable range depending upon the D.S. sought in the final derivative. In the usual case the mole ratio of aldehyde reactant to starch reactant ranges from about 0.05 mole to about 1.0 mole with aldehyde per mole of starch.

The starch source itself may be widely varied although an unmodified granular starch is preferred as a general rule. Thus, for example, the starting starch material used in practicing the invention may be derived from a root, grain or pith source, such as, for example, corn, wheat, potato, tapioca, rice, sago and grain sorghum. Waxy starches may also be used. The term "starch" is used broadly herein and encompasses unmodified starch and tailings, and, as well starch that has been somewhat modified, by treatment with acids, alkalies, enzymes or oxidizing agents. Soluble or partially soluble modified starches, dextrins, pregelatinized products and starch derivatives such as cationic or anionic starches are also suitable here. A preferred starch is ordinary commercial corn starch.

The unsaturated aldehydes useful as reactants in the process of the invention may be represented by the general formula:

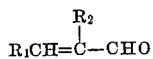

where $R_1$ and $R_2$ may be either hydrogen, lower alkyl radicals or halogen. When $R_1$ or $R_2$ is a lower alkyl radical, it is preferred that the radical contain less than 6 carbon atoms and more preferably 3 carbon atoms or less. Useful unsaturated aldehydes may be chosen from among acrolein, alpha-methyl acrolein, alpha-ethyl acrolein, alpha-propyl acrolein, alpha-isobutyl acrolein, alpha-amyl acrolein, alpha-n-hexyl acrolein, alpha-bromo acrolein, etc. Other representative unsaturated aldehyde reactants are crotonaldehyde, alpha-chloro-crotonaldehyde, beta-chloro-crotonaldehyde, alpha-bromo-crotonaldehyde, alpha-beta-dichloro-crotonaldehyde, alpha-beta-dimethyl acrolein, alpha-methyl-beta-ethyl acrolein, alpha-methyl-beta-isopropyl acrolein, alpha-ethyl-beta-propyl acrolein, etc. Preferred here are acrolein, crotonaldehyde and methacrolein.

At the conclusion of the reaction the product which is obtained is both granular in structure and is substantially noncross-linked in character. These granular starch derivatives are easily cooked or pasted in water to yield aqueous starch pastes which may be then utilized as such and applied to cellulosic materials such as paper, textiles and the like.

The following examples illustrate typical preparations of the above disclosed starch derivatives. It is understood of course, that these examples are merely illustrative, and that the invention is not to be limited thereto.

EXAMPLE I

To a slurry of 1 mole of corn starch (162 grams dry basis) in 200 ml. of water was added 14 grams of $K_2HPO_4$ to attain a pH of 8.0. 25 ml. (0.30 mole) of methacrolein was then added dropwise to the agitated slurry. The mixture was then heated to 50° C. and maintained there for 16 hours. The product was collected on a filter, washed with 5-liters of water and 1-liter of methanol. The Scott viscosity of the product was 10 grams/29 seconds. The oxime derivative was then made and analyzed. Analysis indicates that the product had a D.S. of 0.016.

EXAMPLE II

Here the procedure of Example I was followed with the exception that crotonaldehyde was used in place of methacrolein. The product had a D.S. of 0.012 and a Scott viscosity of 10 grams/62 seconds.

EXAMPLE III

To a slurry of 1 mole of corn starch in 200 ml. of water was added sufficient potassium acetate to raise the pH to 6.0. The mixture was stirred while 10 ml. (0.15 mole) of acrolein was added, and the stirring continued in a closed flask for 16 hours at room temperature. The solid product was collected and washed with 2 liters of water followed by washing with 500 ml. of methanol. The Scott viscosity of the product was 8 grams/49 seconds. The oxime derivative was made and analyzed for nitrogen content. The oxime derivative contained 0.11% nitrogen which corresponds to a D.S. of 0.01.

EXAMPLE IV

A number of other runs were made similar to Example III using either phosphate buffers or acetate buffers at various pH values. Results are given below in Table I.

TABLE I

| Reaction pH | Moles acrolein per mole starch | Reaction time (hours) | Reaction temp., °C. | D.S. | Scott viscosity, g./sec. |
|---|---|---|---|---|---|
| 6.0 | .10 | 16 | 25 | 0.01 | 10/75 |
| 6.0 | .15 | 16 | 25 | 0.01 | 8/49 |
| 6.0 | .40 | 18 | 25 | 0.02 | 12/90 |
| 5.5 | .15 | 16 | 40 | 0.01 | 8/42 |
| 5.5 | .30 | 24 | 25 | 0.015 | 10/98 |
| 5.0 | .10 | 16 | 25 | 0.004 | 10/79 |
| 5.0 | .30 | 20 | 25 | 0.01 | 10/96 |
| 4.5 | .30 | 20 | 25 | 0.01 | 9/49 |
| 4.0 | .30 | 20 | 25 | 0.01 | 9/47 |

EXAMPLE V

In this series of runs a number of varying starches were reacted with acrolein. Reaction conditions and product definitions are given below in Table II.

TABLE II

| Starch source | pH | Aldehyde-starch, molar ratio | Reaction temp., °C. | D.S. | Scott viscosity, 100 ml., g./sec. |
|---|---|---|---|---|---|
| 80-fluidity thinned corn starch | 5.5 | 0.30 | Room temperature | 0.008 | 50/28 |
| Do | 7.0 | 0.15 | do | 0.028 | |
| Do | 7.0 | 0.15 | 40 | 0.033 | |
| Do | 7.0 | 0.45 | Room temperature | 0.10 | |
| Do | 8.0 | 0.15 | do | 0.052 | |
| 40-fluidity thinned corn starch | 5.5 | 0.30 | do | 0.020 | 12/33 |
| 20-fluidity thinned corn starch | 5.5 | 0.30 | do | 0.016 | 12/44 |
| 7-fluidity thinned corn starch | 5.5 | 0.30 | do | 0.014 | 10/41 |
| Pregelatinized corn starch | 5.5 | 0.15 | 40 | 0.007 | |
| Hydroxy ethyl milo starch | 5.5 | 0.15 | Room temperature | 0.005 | 9/39 |
| Cationic corn starch | 5.5 | 0.30 | do | 0.010 | 3/65 |
| Cationic 80-fluidity thinned corn starch | 5.5 | 0.30 | do | 0.018 | 50/27 |
| White dextrin | 5.5 | 0.15 | do | 0.021 | |
| Do | 7.0 | 0.15 | 40 | 0.040 | |
| Do | 7.0 | 0.30 | 40 | 0.064 | |

Thus, it can be seen from the above that the invention encompasses reaction of a wide number of starches and is rather general in character with respect to this factor. In order to evaluate the fiber-binding properties of the products of this invention, a simple laboratory test has been devised. In brief outline, the test consists of padding a dilute solution of the starch derivative product on a standard fiber web, drying and curing the binder/web composition under standard conditions, and finally measuring the tenacity or wet strength of the bound web after satuarting with water. A suitable web can be prepared by carding any staple fiber or fiber mixture, and 2- to 6-ply carded webs of rayon, cotton, polyester and the like have in fact, been made and tested. However, the lightly bonded fabrics appearing under the commercial designation of "lens tissue" and consisting predominantly of staple rayon fiber, have been adopted as the standard. To achieve maximum tenacity without fiber damage all starch products of this invention have been applied at pH of 5.0, although this pH is not limiting, and equal or greater tenacity values may be found within a much broader range of pH.

A standard drying period of 10 minutes at 190° F. under forced draught is followed by curing for two minutes at 295° F. between metal plates. To test, 3 inch by 1¼ inch strips (with their long dimension conforming to the dominant fiber orientation) are cut from the center of a 3-ply cured web. These are then doubled to the width of ⅝ inch and saturated with cold water. Finally, each strip is subjected to a breaking strain in a Model VTA Tensiometer (Detroit Testing Machine Company) which registers tenacity or wet strength in pounds per inch. In all instances 5% of the starch derivative was applied based on the weight of the fiber and starch. Results are given below in Table III.

TABLE III

| Product | D.S. | Wet strength, lb./in. |
|---|---|---|
| Starch | | 0.2 |
| Starch, acrolein reaction product | 0.014 | 1.8 |
| Thinned starch, acrolein reaction product | 0.008 | 1.2 |
| Starch, crotonaldehyde reaction product | 0.012 | 2.8 |
| Starch, methacrolein reaction product | 0.016 | 1.3 |
| Starch, crotonaldehyde reaction product | 0.030 | 1.3 |

In another series of tests it was found that the binding strength of the above products and others falling within the scope of the invention was approximately equal to that realized through use of polyacrylate emulsions, currently being sold for this use.

When used as a binder, the products of the invention show activity at add on levels ranging from about 2% to about 20%, again comparing favorably with typical binder materials used for this purpose. Thus, it can be seen that the products of the invention are excellent fiber-binding agents and may be used in treating non-woven fabrics subsequently to be employed as collar and cuff linings, bouffant linings, disposable-reusable toweling, wiping rags and the like; as well as filter media, including oil, air and milk filters, absorbent disposable sanitary fiber constructions, such as diapers and the like; as well as buffing wheels and abrasive-containing polishing wheels, and other applications whereby a binder must be utilized to make the fibers strongly adhere to one another, or to bind particulate fillers or clays to a fiber base.

The products of the invention are particularly useful as binders for rayon, cotton, or various combinations of these two textile fibers and show marked utility in treating a wide number of synthetic fibers and fiber mixtures.

In addition to the just enumerated uses, the products of the invention may also be used as extenders and modifiers for a large number of synthetic polymer latices and emulsions and as thickening agents for these same latices and emulsions. They have particular usefulness where the resultant latex or emulsion composition is to be extended or filled with whiting or clays for carpet backing or in conjunction with pigments for applications as water-base paints. They are useful alone as a filling binder where clays, whiting, abrasive powders, oils, pigments or oil-pigments or combinations of these are to be bound to textile, paper, glass, metal, wood or other surfaces; as a laminating glue or adhesive for paper, cloth, wood, gypsum-board and the like; as a combination deflocculant and adhesive applied to a clay slip and the like in ceramic processes; as a pre-weave warp-size for cotton, cotton-polyester blends, rayon, and other common staple and filament yarns including glass fibers, etc.

A preferred application lies in treating already woven textiles or paper whereby the resultant treated cellulosic articles are greatly improved with respect to strength, hand, durability, etc.

In applying the products of hte invention to synthetic latices or polymers to effect thickening, extending, modifying, etc. the product preferably is added in its dry, granular form where it thickens the latex by imbibing water. In other applications, such as for use alone as an adhesive, the products of the invention may be applied as hot or cold pastes or dispersions. In many applications, such as in preweave slashing of yarns the products are pasted or cooked to the desired degree and formulated with other additives to impart desired qualities required by the various yarn types.

While the invention has been described in connection with specific embodiments thereof, it will be understood that it is capable of further modification, and this application is intended to cover any variatoins, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A composition of matter useful as a binder for nonwoven fibers and for other applications which comprises a substantially noncross-linked granular starch derivative having the following general structural formula:

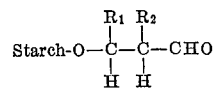

where $R_1$ and $R_2$ are selected from the group consisting of hydrogen, lower alkyl radicals and halogen.

2. A composition in accordance with claim 1 wherein the D.S. is in the range from about 0.001 to about 0.08.

3. A composition in accordance with claim 2 wherein the D.S. is in the range from about 0.004 to about 0.04.

4. A composition in accordance with claim 3 wherein $R_1$ and $R_2$ are hydrogen.

5. A composition in accordance with claim 2 wherein $R_1$ is methyl.

6. A composition in accordance with claim 2 wherein $R_2$ is methyl.

7. A method of preparing the starch derivative of claim 1 which comprises reacting a granular starch slurry with a aldehyde having the following structural formula:

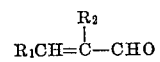

where $R_1$ and $R_2$ are selected from the group consisting of hydrogen, lower alkyl radicals and halogen, said reaction being carried out at a pH in the range from about 4 to about 9, at a temperature in the range from about room temperature to about 50° C., and over a period of time in the range from about 4 to about 24 hours, and wherein the mole ratio of aldehyde to starch reactant is in the range from about 0.05 to about 1.0 mole of aldehyde per mole of starch, and the starch solids content of said starch slurry is in the range from about 15% by weight to about 50% by weight.

8. The method of claim 7 wherein said slurry contains 25%–40% by weight of starch.

9. The method of claim 7 wherein said aldehyde is acrolein.

10. The method of claim 7 wherein said aldehyde is crotonaldehyde.

11. The method of claim 7 wherein said aldehyde is methacrolein.

12. The method of claim 7 wherein said granular starch is a corn starch.

References Cited

UNITED STATES PATENTS

| | | | |
|---|---|---|---|
| 3,069,410 | 12/1962 | Smith et al. | 106—213 X |
| 2,822,298 | 4/1958 | Merrifield | 260—9 X |

JULIUS FROME, Primary Examiner

L. B. HAYES, Assistant Examiner

U.S. Cl. X.R.

106—210, 213; 117—156